(12) United States Patent
Gore et al.

(10) Patent No.: US 6,917,820 B2
(45) Date of Patent: Jul. 12, 2005

(54) METHOD AND APPARATUS FOR SELECTION AND USE OF OPTIMAL ANTENNAS IN WIRELESS SYSTEMS

(75) Inventors: Dhananjay A. Gore, Stanford, CA (US); Rohit U. Nabar, Stanford, CA (US); Arogyaswami Paulraj, Stanford, CA (US); Sumeet Sandhu, Mountain View, CA (US)

(73) Assignee: Stanford University, Palo Alto, CA (US)

( * ) Notice: Subject to any disclaimer, the term of this patent is extended or adjusted under 35 U.S.C. 154(b) by 399 days.

(21) Appl. No.: 09/769,445

(22) Filed: Jan. 26, 2001

(65) Prior Publication Data

US 2002/0102950 A1 Aug. 1, 2002

(51) Int. Cl.[7] ................................................ H04B 1/38
(52) U.S. Cl. ...................... 455/562.1; 455/63.1; 455/69; 455/277.1; 375/349; 370/334
(58) Field of Search .............................. 455/562.1, 101, 455/137, 272, 273, 434, 561, 501, 63.1, 63.4, 67.11, 69, 103, 115.1, 277.1; 370/332, 334; 375/346–349

(56) References Cited

U.S. PATENT DOCUMENTS 6,167,286 A * 12/2000 Ward et al. ............... 455/562.1
6,198,925 B1 * 3/2001 Lee .......................... 455/434
6,229,486 B1 * 5/2001 Krile .................... 343/700 MS
6,301,238 B1 * 10/2001 Hagerman et al. ......... 370/336
6,330,433 B1 * 12/2001 Jager ....................... 455/277.2
6,408,169 B1 * 6/2002 Pallonen .................. 455/277.2
6,438,389 B1 * 8/2002 Sandhu et al. ........... 455/562.1
6,483,884 B1 * 11/2002 Shen et al. ................ 375/347
6,535,733 B1 * 3/2003 Matusevich et al. ....... 455/424
6,574,461 B1 * 6/2003 Skold ....................... 455/277.2
6,600,934 B1 * 7/2003 Yun et al. .................. 455/101

* cited by examiner

Primary Examiner—Edward F. Urban
Assistant Examiner—Blane J. Jackson
(74) Attorney, Agent, or Firm—Mattingly, Stanger, Malur & Brundidge, P.C.

(57) ABSTRACT

A method and apparatus for selecting an optimal set of antennas from a plurality of antennas for use by a transmitter and/or receiver having a plurality of RF chains to transmit and/or receive a wireless signal on a wireless link. According to the invention information concerning transmission of wireless signals on the wireless link is determined and an optimal set of antennas from the plurality of antennas is selected based on the information. Thereafter, the RF chains are connected to the optimal set of antennas to permit transmission and/or reception of the wireless signal from the RF chains on the wireless link via the optimal set of antennas. The RF chains correspond in number to the number of antennas in the optimal set of antennas, and the number of antennas included in the plurality of antennas is greater than the number of RF chains.

22 Claims, 2 Drawing Sheets

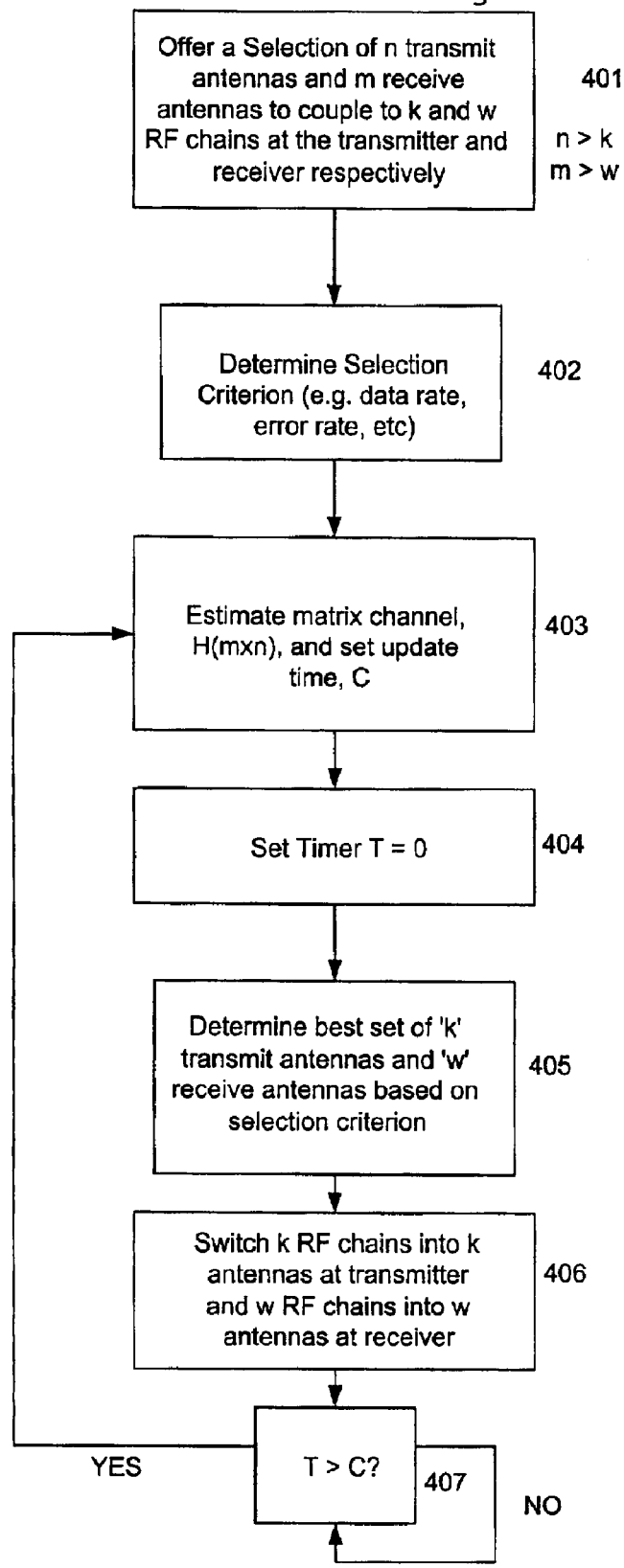

METHOD AND APPARATUS FOR SELECTION AND USE OF OPTIMAL ANTENNAS IN WIRELESS SYSTEMS

BACKGROUND OF THE INVENTION

The present invention relates to a method and apparatus for transmitting and receiving information across a wireless link using a plurality of antennas. More particularly, the present invention relates to a method and apparatus for selecting an optimal set of antennas from a plurality of antennas for use by a transmitter and/or receiver for improving any performance criterion (such as data rate, error rate, etc) over a wireless link.

Current wireless systems generally use single antennas at the transmitter and receiver. For a broad class of wireless systems including mobile and satellite communications, personal communication and wireless network systems, system performance, such as data rate, error rate, etc., can be improved substantially by the use of multiple antennas at the transmitter and/or the receiver.

Different approaches and concerns in implementing such multiple antenna systems are, for example, described in "On Limits of Wireless Communications in a Fading Environment When Using Multiple Antennas" by G. J. Foschini et al, Wireless Personal Communications, Kluwer Academic Publishers, vol. 6, No. 3, pages 311–335, March 1998 (Reference 1); "Capacity of Multi-Antenna Array Systems In Indoor Wireless Environment" by C. Chuah et al, Proceedings of Globecom '98 Sydney, Australia, IEEE 1998, pages 1894–1899 November 1998 (Reference 2); "Fading Correlation and Its Effect on the Capacity of Multi-Element Antenna Systems" by D. Shiu et al, IEEE Transactions on Communications vol. 48, No. 3, pages 502–513 March 2000 (Reference 3); "The Impact of Antenna Diversity On the Capacity of Wireless Communication Systems", by J. H. Winters et al, IEEE Transactions on Communications, vol. 42, No. 2/3/4, pages 1740–1751, February 1994 (Reference 4); "Capacity of Multi-Antenna Gaussian Channels" by E. Telatar, AT&T-Bell Labs. Internal Technical Memorandum, June 1995 (Reference 5); "Increasing capacity in wireless broadcast systems using distributed transmission/directional reception (DTDR)" U.S. Pat. No. 5,345,599.

From the references cited above, it is clear that multiple antennas at the transmitter and/or receiver can be used to increase data rate through spatial multiplexing or reducing error-rate through diversity (space-time/space-frequency coding) or beam-forming. Future configurations may move towards striking a balance between these techniques. Deployment of multiple antenna technology requires the development of advanced space-time/space-frequency processing at the transmitter and receiver. Our invention while facilitating the use of multiple-antenna technology is not restricted to any particular space-time/space-frequency processing at the transmitter and/or receiver but is generally applicable to any wireless transmission/reception scheme employing a plurality of antennas at the transmitter and/or receiver. The particular transmission/reception scheme used will impact the implementation of this invention and vice versa.

Although increasing the number of antennas for transmitting and/or receiving in a wireless system improves the performance of a wireless link, there are some limitations on the applicability of such a strategy. Namely, in such systems for every transmit antenna and every receive antenna a separate RF chain must be provided. Thus, as the number of antennas at transmitter or receiver increase so do the number of RF chains required.

RF (Radio-frequency) chains (transmitter RF chains in particular) are much more expensive than the antenna elements. Thus, increasing the number of antennas in such systems would in effect increase the cost of the system.

Therefore, there is a need to provide a technique that takes advantage of the benefits provided by the use of a multiple antenna configuration without unnecessarily increasing the cost of the apparatus. In addition, under certain circumstances, system performance can be improved by using fewer RF chains than antennas available. The key idea of this patent, namely selection of an optimal set of antennas from a plurality of available antennas at the transmitter and/or receiver to connect the RF chains to is equally applicable in both cases.

Existing patents in related areas include "Receive antenna selection method and diversity receiver", U.S. Pat. No. 6,141,392, "Impairment determination for a diversity antenna selection process", U.S. Pat. No. 6,118,773, "Diversity antenna selection", U.S. Pat. No. 6,002,672 and "Method and arrangement for antenna selection control in a radio receiver", U.S. Pat. No. 5,991,613. All of the above patents are concerned with only single antenna selection at either the transmitter or receiver. None of them refer to multiple antenna selection and are concerned mostly with improving diversity in the system. Our invention deals with the selection of multiple sets of antennas at the transmitter and/or receiver for any criterion such as spatial multiplexing, beam-forming, diversity etc. Our invention is novel and sufficiently different from those mentioned above.

SUMMARY OF THE INVENTION

The present invention provides a method and apparatus wherein a relatively smaller number of RF chains are used at the transmitter and/or receiver and wherein an optimal set of antennas to be used by the RF chains is selected from a plurality of antennas for use in transmitting and/or receiving a wireless signal on a wireless link.

According to the present invention a plurality of RF chains and a plurality of antennas are provided at the transmitter and/or receiver and the number of RF chains is smaller than or equal to the number of antennas. Further, according to the present invention, information concerning transmission and reception of wireless signals on a wireless link is determined and an optimal set of antennas from the plurality of antennas is selected based on the information at the transmitter and/or receiver. The RF chains are then connected to the optimal set of antennas to permit transmission or reception of wireless signals on the wireless link via the optimal set of antennas.

According to the present invention it might be advantageous economically (or from the perspective of improved performance) to use a small number of RF chains and a large number of antennas and connect the RF chains to a selected set of optimal antennas that provide the best performance of the wireless link. One of the basic goals of selecting the optimal set of antennas is to optimize the wireless link being used according to a predetermined criterion including any one of capacity, diversity, spatial multiplexing or any other criteria for which the wireless link is to be used.

BRIEF DESCRIPTION OF THE DRAWINGS

The scope of the present invention will be apparent from the following detailed description, when taken in conjunction with the accompanying drawings, and such detailed description and specific examples, while indicating example embodiments of the invention, are given by way of illustration only, since various changes and modifications within the spirit and scope of the invention will become apparent to those skilled in the art from this detailed description in which:

FIG. 2 is a flowchart of the steps performed according to the present invention.

DETAILED DESCRIPTION OF THE INVENTION

Figure 1:
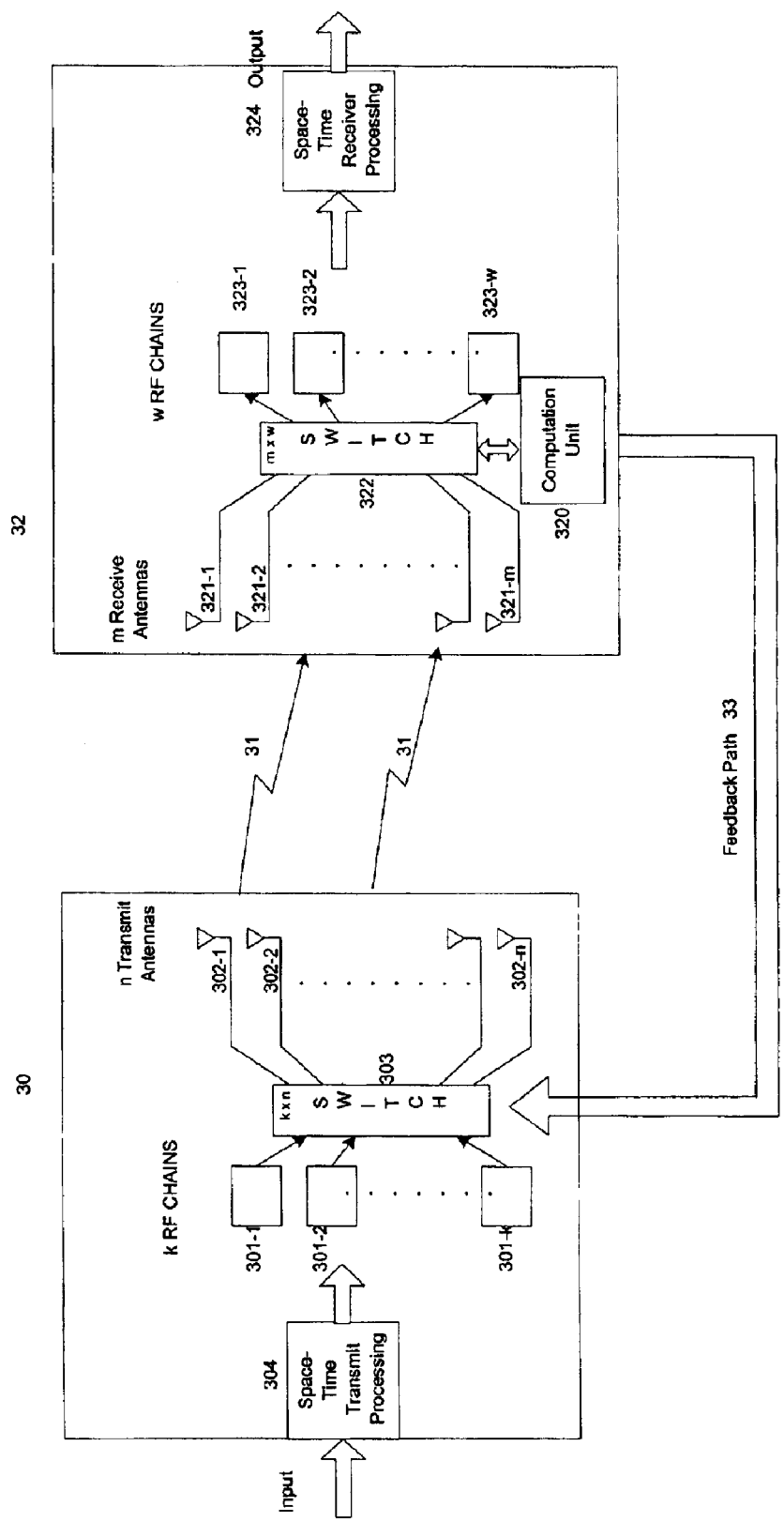
FIG. 1 is a schematic diagram of an example of apparatus configured according to the present invention.

The present invention will be described with respect to FIGS. 1 and 2. However, it should be noted that the present configuration as illustrated in FIGS. 1 and 2 is representative of an embodiment of the present invention. The present invention is not limited to the embodiment illustrated herein. The present invention can be implemented according to any number of embodiments with the primary feature being the selection of an optimal set of antennas from a plurality of antennas wherein the optimal set of antennas corresponds to the number of transmit and/or receive RF chains having a number less than or equal to the number of antennas.

The present invention is intended to operate in a wireless system with multiple antennas at the transmitter and/or receiver. Particularly, the invention provides a method and apparatus for use in a system having a plurality of antennas for transmitting and/or receiving wireless signals over a wireless link. According to the present invention, a plurality of RF chains are provided having a number smaller than or equal to that of the plurality of antennas. Information concerning transmission or reception of wireless signals on the wireless link is determined and an optimal set of antennas from the plurality of antennas is selected based on the information. The optimal set of antennas is connected to the RF chains to permit transmission or reception of wireless signals from or to the RF chains on the wireless link via the optimal set of antennas. According to the present invention, the information is used so as to select the optimal set of antennas that optimizes the wireless link according to criteria including any one of capacity, diversity, spatial multiplexing or any other criteria for which the wireless link is to be optimized.

A discussion of a proof of the benefits of implementing the invention in multiple antenna systems in the special case of improving capacity and the processing necessary so as to select the optimal set of antennas at the transmitter for particular channel conditions can be found in "Selection and Use of Optimal Transmit Antennas in Wireless Systems", ICT'2000, Acapulco, Mexico, May 2000 by R. Nabar. D. Gore and A. Paulraj; "Selecting an Optimal Set of Transmit Antennas for a Low Rank Matrix Channel", ICASSP'2000, Istanbul, Turkey, June 2000 by D. Gore, R. Nabar and A. Paulraj; "A Near-Optimal Technique for Selecting Transmit Antennas based on Shannon Capacity", Asilomar CSSC, Asilomar, November 2000 by S. Sandhu, R. Nabar, D. Gore and A. Paulraj. Though the above papers refer to the case of antenna selection at the transmitter for maximizing capacity, the invention is applicable to any other criterion with selection of an optimal set of antennas from a plurality of antennas at the transmitter and/or receiver.

The features of the present invention can be applied to a multiple antenna system such as that of the MEA or MIMO type systems. One such configuration of the invention is illustrated in FIG. 1.

The present invention as illustrated in FIG. 1 provides a transmitter 30 that transmits wireless signals 31 via transmit antennas 302 on a wireless link to a receiver 32. The transmitter 30 consists of a space-time processing unit 304 that converts the data to be transmitted into signals to be transmitted from each of the antennas 302. The receiver 32 receives such wireless signals 31 via receive antennas 321, and using detected information concerning the wireless signals, determines information concerning transmission of the signals on the wireless link. Based on such information an optimal set of antennas 302 that should be used to transmit the wireless signals 31 to the receiver 32 and an optimal set of receive antennas 321 to receive the signals 31 is determined. Such information is provided to the transmitter, for example, through a feedback path 33 from the receiver 32 to the transmitter 30. The receiver 32 also consists of a space-time processing unit 324 to convert the signals received on the antennas 321 into output data.

The transmitter 30 includes a plurality of RF chains 301-1 through 301-k which can be selectively coupled to a plurality of antennas 302-1 through 302-n by a switch 303. The switch 303 can connect k RF chains 301 to any set of k transmit antennas from the n available transmit antennas 302. The receiver 32 includes a plurality of antennas 321-1 through 321-m which can be selectively coupled to a plurality of RF chains 323-1 through 323-w by a switch 322. The switch 322 can connect w RF chains 323 to any set of w receive antennas from the m available receive antennas 321.

According to the present invention the number of RF chains 301 is less than the total number of transmit antennas n available for use by the transmitter 30. Also, the number of RF chains 323 at the receiver is less than the total number of receive antennas m available for use by the receiver 32. The switch 303 responds to the information provided by the feedback path 33 from the receiver 32 so as to cause the switch 303 to connect k RF chains 301 to the optimal set of transmit antennas 302. Similarly, the switch at the receiver 322 connects the w RF chains 323 to the optimal set of w receive antennas 321.

The receiver includes an optimal set computation unit 320 which based upon the wireless signals 31 transmitted on the wireless link, determines information which is used to select an optimal set of transmit antennas 302 and receive antennas 321 which should be used to transmit and receive wireless signals from the transmitter 30 and receiver 32 respectively. Therefore, the optimal set of antennas is chosen according to the information concerning the wireless link upon which the transmissions are to occur so as to optimize performance over the wireless link. This information concerning the wireless link is gathered and/or detected by the optimal set computation unit 320 and used to compute the optimal set of transmit antennas 302 and receive antennas 321 to conduct the transmission and reception on the wireless link. Information concerning the transmit antennas 302 to be selected is provided by the feedback path 33 to the transmitter from the optimal set computation unit 320.

According to the invention, the information concerning the wireless link gathered and/or detected by the optimal set computation unit 320 is used to optimize the wireless link according to criteria including any one of capacity, diversity, spatial multiplexing or any other criteria for which the wireless link is to be used. It should be noted that the optimal antenna set can be computed at the transmitter 30 itself if the channel is known to the transmitter 30 (as in the case of TDD (Time Division Duplex) systems) or if the channel state is fed back to the transmitter 30.

The procedure performed by the above-described apparatus for implementing the present invention is illustrated by the flowchart of FIG. 2. It should be noted that each of the steps of the flowchart could, for example, be instructions or sections of code of a computer program that could, for example, be executed by the optimal set computation unit 320.

According to the flowchart illustrated in FIG. 2, the invention offers a selection of n transmit antennas 302 for coupling to k RF chains 301 (step 401) and m receive antennas 321 for coupling to w RF chains 323. Thereafter, the selection criterion is determined (step 402). The criterion can be any one of capacity, diversity, spatial multiplexing or any other criteria that could be used to optimize the wireless link upon which wireless signals are transmitted between the transmitter and the receiver.

After determining the selection criterion, an estimate is performed of the matrix channel, H(mxn) and an update time c (time chosen by system designers to update channel state information) (step 403). This step can be performed at either the transmitter 30 or the receiver 32 depending on the system. The timer is then set to 0 (step 404). Thereafter, the best set of k transmit antennas 302 and w receive antennas 321 is determined based upon the selection criteria determined according to step 402 (step 405). The basic intent here is to optimize some system parameter such as data rate, bit error rate, etc so to optimize use of the wireless link upon which wireless signals are transmitted between the transmitter 30 and the receiver 32.

Once the best set of k transmit antennas 302 and w receive antennas 321 has been determined, the k RF chains 301 are then connected through a switch 303 to the selected set of k transmit antennas 302 (step 406) and the w RF chains 323 are connected through a switch 322 to the selected set of w receive antennas 321. A step is performed so as to determine whether the time elapsed is greater than the update time c. If the time set by the timer is greater than the update c time then the procedure moves back to step 403. Otherwise the system continues to monitor the timer and waits until the timer exceeds the update time c before proceeding to step 403.

Thus, by use of the invention as, for example, illustrated in FIG. 1, an optimal set of transmit antennas 302 are switched so as to be coupled to the fixed number of RF chains 301 based upon information concerning the selected optimal set of transmit antennas 302 provided by the computation unit 320 along the feedback path 33. The information provided by the computation unit 320 also enables coupling the optimal set of receive antennas 321 to the fixed number of RF chains 323 at the receiver.

It should be noted that the optimal set computation unit 320 could also, for example, be positioned in the transmitter 30 thereby eliminating the feedback path 33 from the receiver 32 to the transmitter 30. Further, it should be noted that the feedback path 33 could, for example, be provided through a wireless communications network (not shown) within which the transmitter 30 and receiver 32 are used. Additionally, it should be noted that that the choice of transmit antennas 302 and receive antennas 321 made by the computational 320 unit may not be optimal, but sub-optimal or close to optimal due to limitations of complexity or other design criteria.

Further, it should be noted that a similar configuration and selection apparatus could be created under the framework of this invention to select an optimal set of antennas from a plurality of receive antennas 321 at only the receiver 32 or an optimal set of transmit antennas from a plurality of antennas 302 at only the transmitter.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of selecting an optimal set of antennas from a plurality of antennas for use by a transmitter having a plurality of RF chains to transmit and/or receive a wireless signal on a wireless link, said method comprising the steps of:

determining, based on wireless signals on said wireless link received at a receiver, information concerning transmission of wireless signals on said wireless link, wherein said information includes at least one of channel capacity, diversity, spatial multiplexing or any other criteria used to optimize the wireless link;

selecting, at said transmitter, an optimal set of antennas from said plurality of antennas based on said information, wherein said optimal set of antennas is a set number of said plurality of antennas; and connecting said RF chains to said optimal set of antennas to permit transmission of said wireless signal from said RE chains on said wireless link via said optimal set of antennas, wherein said RE chains correspond in number to the set number of antennas in said optimal set of antennas, and the number of antennas included in said plurality of antennas is greater than the number of RF chains.

2. A method according to claim 1, wherein said determining step is performed at a receiver.

3. A method according to claim 1, wherein said determining step is performed at said transmitter.

4. A transmitter comprising:

a plurality of antennas;

a plurality of RF chains, each RF chains transmits a wireless signal on a wireless link to a receiver via one of said plurality of antennas; and an antenna selection apparatus which selects an optimal set of antennas from said plurality of antennas for use by said RF chains to transmit said wireless signal on said wireless link, wherein said optimal set of antennas is a set number of said plurality of antennas, wherein information concerning transmission of wireless signals on said wireless link is determined, based on wireless signals on said wireless link received at a receiver, wherein said antenna selection apparatus selects an optimal set of antennas from said plurality of antennas based on said information, and connects said RF chains to said optimal set of antennas to permit transmission of said wireless signal from said RF chains on said wireless link via said optimal set of antennas, wherein said information includes at least one of channel capacity, diversity, spatial multiplexing or any other criteria used to optimize the wireless link, and wherein said RF chains correspond in number to the set number of antennas in said optimal set of antennas, and the number of antennas included in said plurality of antennas is greater than the number of RE chains.

5. A transmitter according to claim 4, wherein said information received by said antenna selection apparatus is determined at said transmitter.

6. A transmitter, comprising:
a plurality of antennas;
a plurality of RE chains, each RF chains transmits a wireless signal on a wireless link to a receiver via one of said plurality of antennas; and
an antenna selection apparatus which selects an optimal set of antennas from said plurality of antennas for use by said RF chains to transmit said wireless signal on said wireless link,
wherein said optimal set of antennas is a set number of said plurality of antennas,
wherein said antenna selection apparatus determines information concerning transmission of wireless signals on said wireless link, selects an optimal set of antennas from said plurality of antennas based on said information, and connects said RF chains to said optimal set of antennas to permit transmission of said wireless signal from said RF chains on said wireless link via said optimal set of antennas, and
wherein said RF chains correspond in number to the set number of antennas in said optimal set of antennas, and the number of antennas included in said plurality of antennas is greater than the number of RF chains,
wherein said receiver includes a plurality of antennas.

7. A transmitter comprising:
a plurality of antennas;
a plurality of RF chains, each amplifier transmits a wireless signal on a wireless link to a receiver via one of said plurality of antennas; and
an antenna selection apparatus which selects an optimal set of antennas from said plurality of antennas far use by said RF chains to transmit said wireless signal on said wireless link,
wherein said optimal set of antennas is a set number of said plurality of antennas,
wherein said antenna selection apparatus receives information concerning transmission of wireless signals on said wireless link, selects an optimal set of antennas from said plurality of antennas based on said information, and connects said RF chains to said optimal set of antennas to permit transmission of said wireless signal from said RE chains on said wireless link via said optimal set of antennas, and
wherein said RF chains correspond in number to the set number of antennas in said optimal set of antennas, and the number of antennas included in said plurality of antennas is greater than the number of RE chains.

8. A transmitter according to claim 7, wherein said receiver includes a plurality of antennas.

9. A transmitter according to claim 7, wherein said information is used to optimize said wireless link according to criterion including any one of capacity, diversity, spatial multiplexing and any other criterion for which the wireless link is to be optimized.

10. A transmitter according to claim 7, wherein said information received by said antenna selection apparatus is determined at said receiver.

11. A receiver comprising:
a plurality of antennas;
a plurality of receive radio frequency (RF) chains, each receive RF chain receives a wireless signal on a wireless link from a transmitter via one of said plurality of antennas; and
an antenna selection apparatus which selects an optimal set of antennas from said plurality of antennas for use by said receive RF chains to receive said wireless signal on said wireless link,
wherein said optimal set of antennas is a set number of said plurality of antennas,
wherein information concerning receiving of wireless signals on said wireless link is determined, based on wireless signals on said wireless link received at a receiver,
wherein said antenna selection apparatus selects an optimal set of antennas from said plurality of antennas based on said information, and connects said receive RF chains to said optimal set of antennas to permit receipt of said wireless signal from said receive RF chains on said wireless link,
wherein said information includes at least one of channel capacity, diversity, spatial multiplexing or any other criteria used to optimize the wireless link, and
wherein said receive RF chains correspond in number to the set number of antennas in said optimal set of antennas, and the number of antennas included in said plurality of antennas is greater than the number of said receive RF chains.

12. A receiver according to claim 11, wherein said information received by said antenna selection apparatus is determined at said receiver.

13. A receiver, comprising:
a plurality of antennas;
a plurality of receive radio frequency (RF) chains, each receive RF chain receives a wireless signal on a wireless link from a transmitter via one of said plurality of antennas; and
an antenna selection apparatus which selects an optimal set of antennas from said plurality of antennas for use by said receive RF chains to receive said wireless signal on said wireless link,
wherein said optimal set of antennas is a set number of said plurality of antennas,
wherein said optimal set of antennas is a set number of said plurality of antennas,
wherein said antenna selection apparatus determines information concerning receiving of wireless signals on said wireless link, selects an optimal set of antennas from said plurality of antennas based on said information, and connects said receive RF chains to said optimal set of antennas to permit receipt of said wireless signal from said receive RF chains on said wireless link, and
wherein said receive RF chains correspond in number to the set number of antennas in said optimal set of antennas, and the number of antennas included in said plurality of antennas is greater than the number of said receive RF chains,
wherein said transmitter includes a plurality of antennas.

14. A receiver comprising:
a plurality of antennas;
a plurality of receive radio frequency (RF) chains, each receive RF chain receives a wireless signal on a wireless link from a transmitter via one of said plurality of antennas; and
an antenna selection apparatus which selects an optimal set of antennas from said plurality of antennas for use by said receive RF chains to receive said wireless signal on said wireless link, wherein said optimal set of antennas is a set number of said plurality of antennas, wherein said antenna selection apparatus receives information concerning transmission of wireless signals on said wireless link, selects an optimal set of antennas from said plurality of antennas based on said information, and connects said receive RF chains to said optimal set of antennas to permit receipt of said wireless signal from said receive RF chains on said wireless, and wherein said receive RE chains correspond in number to the set number of antennas in said optimal set of antennas, and the number of antennas included in said plurality of antennas is greater than the number of said receive RF chains.

15. A receiver according to claim 14, wherein said transmitter includes a plurality of antennas.

16. A receiver according to claim 14, wherein said information is used to optimize said wireless link according to criterion including any one of capacity, diversity, spatial multiplexing and any other criterion for which the wireless link is to be optimized.

17. A receiver according to claim 14, wherein said information received by said antenna selection apparatus is received by said receiver.

18. A transmitter comprising:

a plurality of antennas;

a plurality of RF chains, each RF chain transmits a wireless signal on a wireless link to a receiver via one of said plurality of antennas; and an antenna selection apparatus which selects an optimal set of antennas from said plurality of antennas for use by said RF chains to transmit said wireless signal on said wireless link, wherein said optimal set of antennas is a set number of said plurality of antennas, wherein information concerning transmission of wireless signals on said wireless link is determined, based on wireless signals on said wireless link received at a receiver, wherein said antenna selection apparatus determines an optimal number of antennas based on said information, selects an optimal set of antennas from said plurality of antennas according to said optimal number of antennas determined based on said information, and connects said RF chains to said optimal set of antennas to permit transmission of said wireless signal from said RF chains on said wireless link via said optimal set of antennas, wherein said information includes at least one of channel capacity, diversity, spatial multiplexing or any other criteria used to optimize the wireless link, and wherein said RF chains correspond to a number at least equal to a highest possible optimal number of antennas to be determined based on said information, and the number of antennas included in said plurality of antennas is greater than the number of RF chains.

19. A transmitter comprising:

a plurality of antennas;

a plurality of RF chains, each RF chain transmits a wireless signal on a wireless link to a receiver via one of said plurality of antennas; and an antenna selection apparatus which selects an optimal set of antennas from said plurality of antennas for use by said RE chains to transmit said wireless signal on said wireless link, wherein said optimal set of antennas is a set number of said plurality of antennas, wherein said antenna selection apparatus determines information concerning transmission of wireless signals on said wireless link, determines an optimal number of antennas based on said information, selects an optimal set of antennas from said plurality of antennas according to said optimal number of antennas determined based on said information, and connects said RF chains to said optimal set of antennas to permit transmission of said wireless signal from said RF chains on said wireless link via said optimal set of antennas, and wherein said RF chains correspond to a number at least equal to a highest possible optimal number of antennas to be determined based on said information, and the number of antennas included in said plurality of antennas is greater than the number of RF chains, wherein said receiver includes a plurality of antennas.

20. A transmitter comprising:

a plurality of antennas;

a plurality of RF chains, each amplifier transmits a wireless signal on a wireless link to a receiver via one of said plurality of antennas; and an antenna selection apparatus which selects an optimal set of antennas from said plurality of antennas for use by said RF chains to transmit said wireless signal on said wireless link, wherein said optimal set of antennas is a set number of said plurality of antennas, wherein said antenna selection apparatus receives information concerning transmission of wireless signals on said wireless link, determines an optimal number of antennas based on said information, selects an optimal set of antennas from said plurality of antennas according to said optimal number of antennas determined based on said information, and connects said RF chains to said optimal set of antennas to permit transmission of said wireless signal from said RF chains on said wireless link via said optimal set of antennas, and wherein said RF chains correspond to a number at least equal to a highest possible optimal number of antennas to be determined based on said information, and the number of antennas included in said plurality of antennas is greater than the number of RF chains.

21. A transmitter according to claim 20, wherein said receiver includes a plurality of antennas.

22. A transmitter according to claim 20, wherein said information is used to optimize said wireless link according to criterion including any one of capacity, diversity, spatial multiplexing and any other criterion for which the wireless link is to be optimized.

* * * * *